United States Patent [19]

Vollrath

[11] 4,348,718

[45] Sep. 7, 1982

[54] TIMING GENERATOR FOR USE WITH MULTI-PHASE CONTROL RECTIFIER SYSTEMS

[75] Inventor: Donald E. Vollrath, Greenfield, Wis.

[73] Assignee: Litton Industrial Products, Inc., Beverly Hills, Calif.

[21] Appl. No.: 234,064

[22] Filed: Feb. 12, 1981

[51] Int. Cl.³ .............................................. H02P 13/24
[52] U.S. Cl. ...................................... 363/87; 318/803
[58] Field of Search ................... 363/96, 87, 128, 129; 318/762, 803, 805

[56] References Cited

U.S. PATENT DOCUMENTS 3,704,408 11/1972 Schroeder ............................ 363/87

FOREIGN PATENT DOCUMENTS 2700872 7/1978 Fed. Rep. of Germany ...... 363/129

Primary Examiner—William M. Shoop
Attorney, Agent, or Firm—Robert A. Seldon

[57] ABSTRACT

A timing generator for use with multi-phase controlled rectifier systems is disclosed in which a ramp signal is produced in phase synchronization with the power source and compared with the value of a command signal. The command signal is indicative of the desired SCR ignition angle. A sequencing circuit, having a finite number of output states is cyclically stepped from one state to the next by the comparator. The sequence circuit couples a source of SCR-gating pulses to the appropriate SCR in accordance with its state and with a predetermined pattern of SCR ignitions which characterize the multi-phase source.

One aspect of the invention concerns the multiplexing of the comparator output whereby the command signal is offset by 60° (electrical) after each comparator transition to set up conditions for the next transition.

A further aspect of the invention concerns the generation of an alternate ramp, 180° (electrical) out of phase with the foregoing ramp, and selectively applied to the comparator during periods in which the first ramp is discontinuous. The interrelationship of the 60° interval associated with the command signal offset, and the 180° relationship between the two ramps is advantageously utilized in the repeated offsetting of the command signal.

13 Claims, 7 Drawing Figures

Fig_1

Fig_3

Fig_2A

Fig_2B

Fig_2C

Fig_2D

Fig_2E

Fig._4A

Fig_4B

TIMING GENERATOR FOR USE WITH MULTI-PHASE CONTROL RECTIFIER SYSTEMS

This invention relates to multi-phase controlled rectifier systems such as those commonly employed to control the armature voltage and current of a D.C. motor, thereby consequently controlling the torque and speed of the motor.

As is known in the art, rectifier systems are coupled between a multi-phase AC power line and the motor to convert the AC line current to a D.C. current of controllably varied average value. The rectifier systems comprise a plurality of silicon controlled rectifiers (SCR's), half of which are respectively coupled anode-to-cathode from a different one of the power lines to the positive DC output terminal and half of which are respectively coupled cathode-to-anode from a different one of the power lines to the negative DC output terminal. For the purposes herein, the nomenclature adopted to identify the SCR's with indicate the power line and DC terminal coupled thereby. For example, SCR "A+" will be taken to mean the SCR connected between power line A and the positive DC terminal. Additionally, it will be understood that functionally equivalent components could be substituted for SCR's without departing from the scope of the subject invention.

As is also known in the art, the SCR's of a rectifier system are selectively gated in pairs to couple the power lines pair having the greatest voltage between them to the respective output DC terminals. The SCR's are typically gated at controllably varied phase angles in the AC cycle to correspondingly vary the average current coupled into the armature circuit by the SCR's.

One major obstacle to the use of phase control rectifiers has been the uncontrolled phase shifts of power line voltages. These phase shifts are created for example, by the utilities' generators when their load changes; specifically, the phase angle of the generators lag with increasing load. Additionally, utilities will knowingly change the frequency of the line voltage slightly to compensate for accumulated phase changes so that the average frequency from the utility will be constant. Accordingly, the present invention is directed to a timing generator which synchronizes the SCR-gating pulses to the power line phase and thereby tracks such phase changes.

The present invention is directed to a timing generator for use with multi-phase rectifier systems of the foregoing type; namely, those which include a plurality of selectively gateable semiconductive devices coupled between a multi-phase power source and a D.C. load and arranged to couple rectified D.C. voltage across the load. The timing generator, as indicated above, functions to selectively gate appropriate semiconductive devices at appropriate power line phase angles so as to controllably vary the rectified voltage. As will be described in greater detail with reference to the preferred embodiment, the timing generator herein comprises means for producing a first signal having unique values representative of respective power line phase angles and comparator means adapted to receive a command signal indicative of the ignition phase angle at which gating is desired and for comparing the first and command signal value. The comparator means undergoes a transition in output state when the two signals are substantially equal.

The timing generator additionally comprises sequence means having a plurality of sequentially occurring output states. The sequence means is responsive to the transition of the comparator means to assume the sequentially next output state when gating occurs. The sequence means includes first decoding means responsive to the output states to couple uniquely respective semi-conductive devices to a source of gating pulses in accordance with the ignition pattern associated with the multi-phase source.

A timing generator constructed in accordance with the invention is described in detail in the following Description of a Preferred Embodiment of which the following drawing is a part.

In the drawing, wherein like reference numerals are used throughout the various Figures to denote corresponding components.

FIG. 2 a-e are waveforms associated with the voltages at various locations within the timing generator circuitry;

Figure 1:
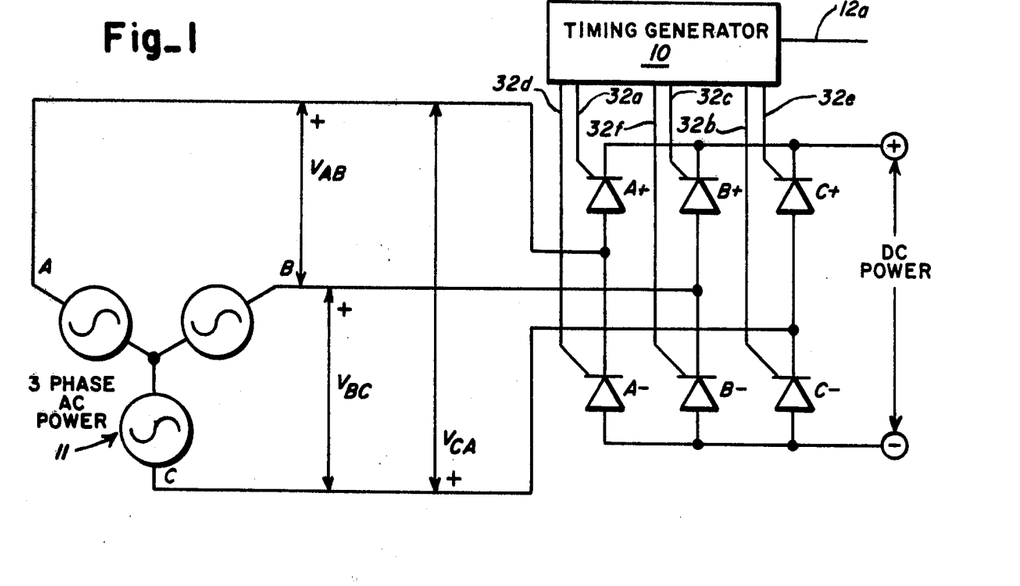
FIG. 1 is a block diagram of the timing generator coupled to a representative power circuit and rectifier system.

With initial reference to FIG. 1, a timing generator 10 is illustrated as being coupled to gate leads 32 a-f of six SCR's which form a part of a rectifier system for a 3-phase, AC power source 11. The source 11 is shown to have conventionally identified lines A, B, and C and is characterized by a 3-phase voltage illustrated in FIG. 2A. SCR's A+, B+, C+ are respectively coupled anode-to-cathode from the A,B and C lines of the power source to a positive DC output terminal. Similarly, SCR's A−, B−, C− are respectively coupled cathode-to-anode from the A, B and C lines to a negative DC output terminal. As is known in the art, the DC output terminals may, for example, be coupled to the armature circuit of a DC motor. Oppositely polarized pairs of SCR's are selectively gated to rectify the AC power current, the average value of the rectified voltage and current being controllably varied by corresponding changes in the SCR firing angles. The selective gating appropriate SCR pair and the firing angle are controlled by the timing generator 10 as hereinafter described.

Figure 2A:
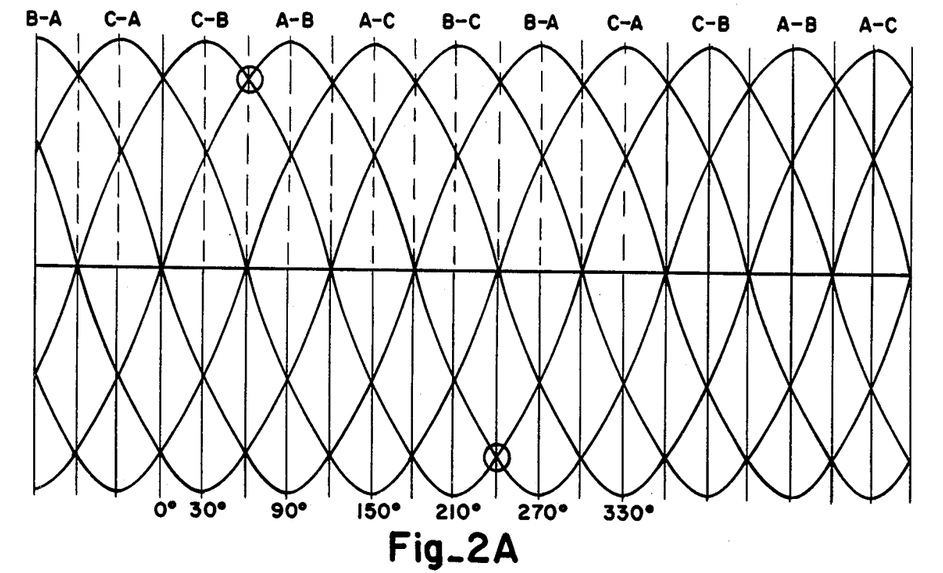
Figure 2B:
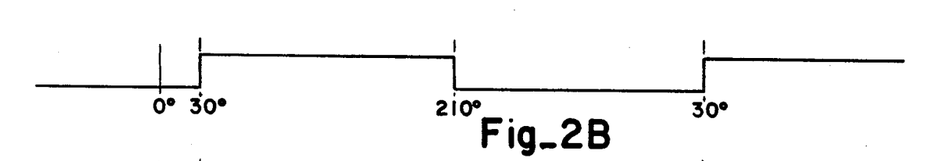
Figure 2C:
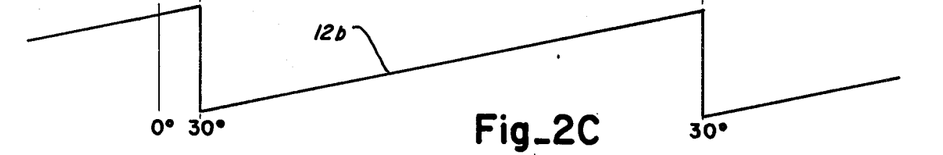
Figure 2D:
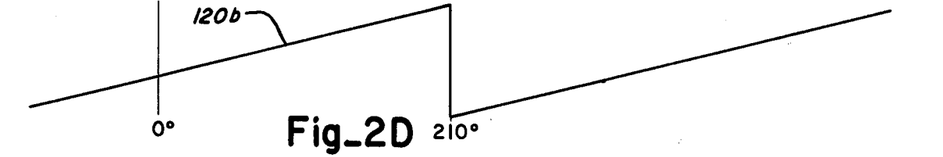
Figure 2E:
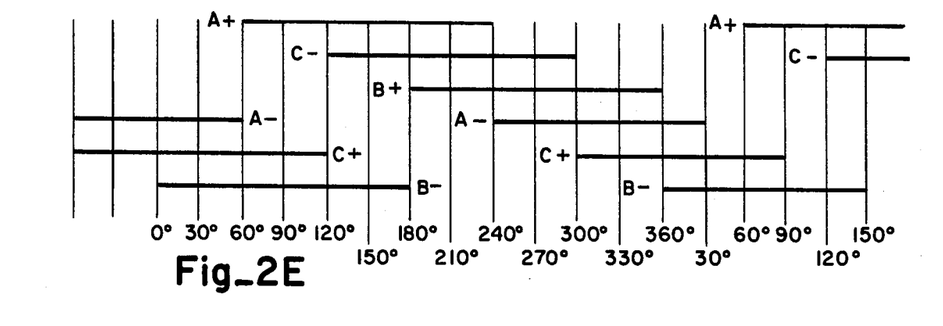
Figure 3:
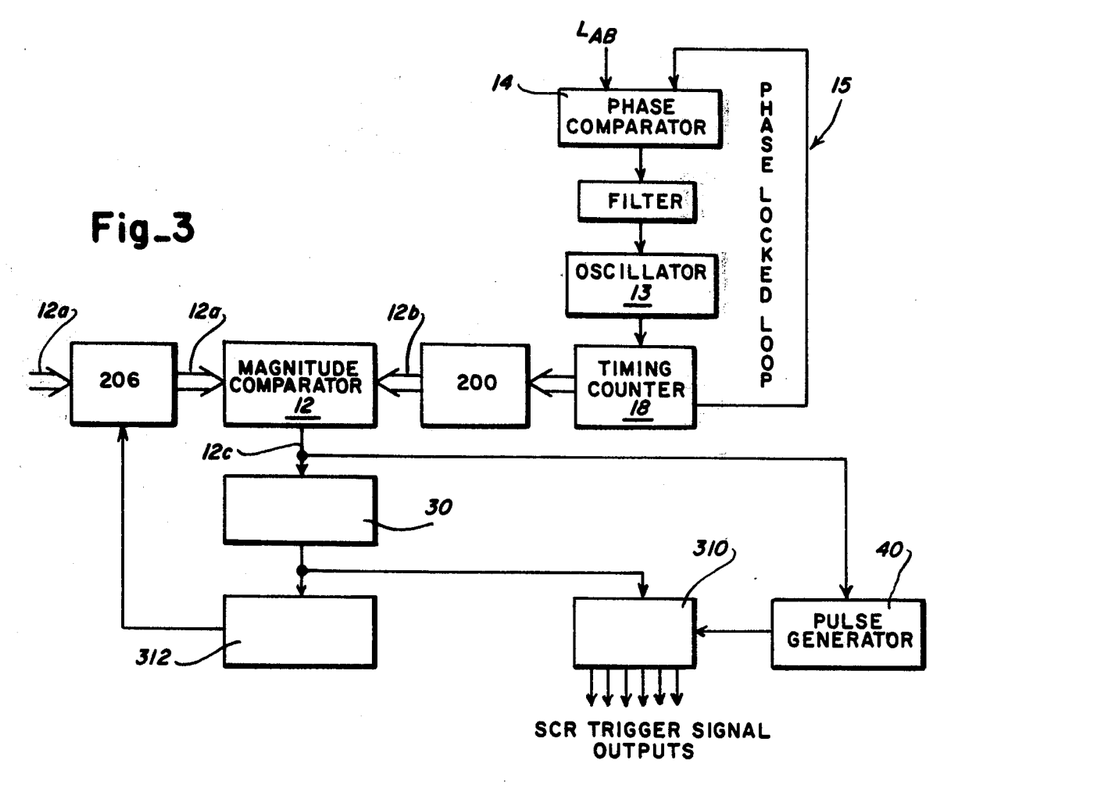
FIG. 3 is a block diagram representation of the timing generator.

FIGS. 2 and 3 are referenced for an initial overview of the timing generator 10. As shown in FIG. 3, a magnitude comparator 12 receives a pair of signals 12a, 12b. The signal 12b is preferably a multi-bit digital signal of cyclically increasing magnitude (FIG. 2c) which is synchronized with a reference line voltage of the three-phase power supply. The signal 12a is indicative of an externally derived parameter, such as desired motor voltage and is produced by feedback means in the overall motor control system; signal 12a is preferably also a multi-bit digital signal.

The signal 12b is shown in FIG. 2c to possess a ramp-like characteristic comprising a number of incremental magnitude changes. For convenience, the signal 12b will be referred to as a ramp. The ramp 12b is produced by a timing counter 18 coupled to the output of an oscillator 13, which, in turn, is coupled to the output of a phase comparator 14. The phase comparator has two input terminals respectively coupled to a reference signal $L_{AB}$ and to the output of the timing counter 18 to form a phase locked loop 13.

The reference signal $L_{AB}$, illustrated in FIG. 2B, is a bi-level logic signal indicative of the polarity of the reference line voltage $V_{AB}$. Specifically $L_{AB}$ is produced by means not shown but which is known in the art, to undergo a lo-to-high transistion 30° (electrical) after the polarity of $V_{AB}$ becomes positive. The 30° delay prevents power line interferences, common in an industrial environment, from affecting the operation of the circuit.

The phase comparator 14 is an edge-sensitive device which responds to the phase difference between a set of reference pulses and a set of feedback pulses by producing an output pulse. The output pulse starts with the commencement of a reference pulse and ends with the start of a feedback pulse. By coupling the output pulses across an input of the voltage controlled oscillator, the oscillator frequency is made responsive to the phase difference between the reference and feedback pulses. The net result of the illustrated configuration is that the counter 18 counts the number of oscillations to produce the ramp 12b and resets itself in phase syncronization with the reference line voltage; the syncronization occurs once for each cycle of power line voltage. Thus, a change in the time-phase relationship of the power line results in an immediate corresponding change in the time-phase relationship of the ramp 12b.

The magnitude comparator 12 is configured to emit a trigger signal 12c when the inputs 12a, 12b are equal (hereinafter referred to as the "transition point"); thus, as will become apparent, the signal 12a is functionally indicative of the line voltage phase angle at which the SCR's are to be gated and the occurrence of the trigger signal 12c with track any shift in power line phase. The trigger signal 12c is directed to a pulse generator 40 which responsively produces an SCR-gating pulse of appropriate magnitude and duration. The gating pulse is, in turn, directed to the appropriate SCR by first decoding means 310, described hereinbelow.

At the time the trigger signal 12c is applied to the pulse generator 40, it is also applied to a step sequence circuit 30. The step sequence circuit 30 possesses a finite number of sequential output states which are equal in number to the number of SCR's in the rectifier circuit. The trigger signal 12c causes the sequence circuit 30 to step to its sequentially next state, whereby a state-indicative signal 30a is produced.

The state indicative signal 30a from the sequencer, is coupled to first and second decoding means 310, 312 respectivey. The first decoder 310 decodes the signal 30a to gate the appropriate SCR.

In the interest of laying an appropriate foundation for the understanding of the first decoding means 310, attention is initially directed to FIGS. 1 and 2E from which the predictability of the firing sequence of the SCR's may be appreciated. Remembering that the sequence shown is for ABC line rotation, and assuming maximum armature voltage, one may observe that SCR's C+, B− will be conducting at $\phi_{AB}=0°$, and that SCR A+ will be gated at $\phi_{AB}=60°$ with SCR's A+, B− thereafter conducting. SCR C− will be gated ON at $\phi_{AB}=120°$, SCR B+ at 180°, etc.

While a variation on ignition angle will change the foregoing angles, the firing sequence of the SCR's will remain the same. Accordingly, the first decoding means 310 is responsive to each new output state of the sequencer 30 to enable a uniquely respective SCR pair, which SCR pair is the sequentially next conducting pair in the rotation-related sequence.

As indicated earlier in the Description, a change in motor torque is created by a change in the average armature current, which, in turn, is caused by a change in the firing angles of the SCR pairs respectively associated with the line-to-line voltages. By way of example, reference is made to FIGS. 2A and 2E wherein FIG. 2E graphically illustrates the firing angle ranges for the SCR's (FIG. 1).

Once the initial transition point in a power line cycle (i.e. starting at $\phi_{AB} \times 0°$) and the gating pulse has been coupled to an appropriate SCR, the second decoding means provides additional decoding which sets up the conditions for determining the next SCR ignition. First, the input signal 12a modified by means 206 responsive to the second decoding means to effectively offset the input signal 12a magnitude so that the signal 12a and ramp 12b will again be equal in magnitude 60 (electrical) later in the power line cycle. The 60° (electrical) interval transition points insures that the currents provided by the rectifier system will be inherently balanced. Those skilled in the art will recognize, that while a 60° interval is desirable for 3-phase system, the interval will typically be 360°/2n where n is the number of phases on the power line.

In addition to assuring a balanced system by multiplexing of SCR ignitions via a single comparator circuit, the instant system is free of significant time lags in responding to changes of the command signal 12a. The characteristics of the phase locked loop, which is syncronized to the power line during each cycle, remain independent of ignition angle changes and the generator is free of loop-included response delays when such changes ae required.

Turning to FIG. 4 for a more detailed description of the generator 10, the digital magnitude comparator 12 is shown receiving the first multi-bit signal 12a indicative of the SCR ignition angle and the second signal 12b which represents the phase angle of a reference line-to-line voltage.

The second signal 12b is the numerical ramp (FIG. 2c) which cycles in phase syncronization with the reference line-to-line voltage $V_{AB}$ (FIG. 2a). The comparator 12 undergoes an output state transition and thereby produces a trigger signal 12c when the numerical magnitude of the ramp 12b becomes greater than the first signal 12a.

The ramp 12b is produced by a timing counter 18 which cycles in phase-syncronization with the reference power line voltage $V_{AB}$. The timing counter 18 is part of a phase-locked loop which comprises a phase comparator and voltage controlled oscillator, conveniently formed on a single integrated circuit such as an RCA CD4046 and identified in FIG. 4 by numeral 14. The oscillator runs at an exact multiple (preferably 1536) of power line frequency to drive the counter 18. The counter 18 is a "divide-by" type which recyles by overflowing in phase syncronization with the reference line voltage.

As shown in FIG. 4, the counter 18 comprises three cascaded hexidecimal counters 182, 184, 186. Because the counter 18 operates at 1536 (i.e. 16×16×6) times the power line frequency those skilled in the art will appreciate that the most significant counter 186 will increment six times per power source cycle. Thus, the bits from counter 186 will increment once every 60° (electrical).

This feature will be referred to later in the Description as simplifying the means by which I perform the previously described 60° offsets of the command signal 12a after each comparator transition. For the present, however, it should be noted that for ease of implementation in any n-phase system, the incremental states of the counter should preferably by a binary sub-multiple of 360°/n.

In operation, a logic level signal $L_{AB}$ is applied to the input of a Schmitt trigger 102. The Schmitt trigger 102 eliminates line noise and provides a crisp lo-to-high transition which is coupled to the phase-comparator/oscillator 14 as a syncronizing signal, and to other portions of the generator as a clock signal. Signal $L_{AB}$ is produced by means known in the art to undergo a lo-to-high transition 30° (electrical) after the reference line voltage $V_{AB}$ becomes positive, and to undergo a hi-to-lo transition 30° (electrical) after $V_{AB}$ becomes negative. As previously indicated, the 30° delay was arbitrarily selected to minimize interferences from power line disturbances commonly found in an industrial environment. As shown in FIG. 2B, $L_{AB}$ will be high for phase angles of 30°–210°.

The counter 18 is arranged to count the clock pulses from the oscillator 14 and to thereby produce the stepped multi-bit numerical ramp 12b (FIG. 2C). NAND gate 181 is coupled to the counter to form a divider chain which feeds a single pulse back to the feedback terminal of phase comparator 14 when the counter 18 reaches a hexidecimal state of 5FF. The next clock pulse resets the most significant stage 186 of the counter 18 to zero via NAND gate 181 and the least significant stages 182, 184 reset at that time by overflowing.

It may be seen from FIG. 2C that, during each cycle of the reference power line, ramp 12b will have a unique value at each phase angle. Accordingly, and with reference to FIG. 4, the multi-bit command is applied to the magnitude comparator 12. When the ramp 12b reaches or exceeds the numerical magnitude of the command signal, indicating the attainment of that phase angle, the trigger pulse signal 12c Is produced.

The trigger phase 12c is coupled through syncronizing circuitry 20 to sequencing circuit 30 and pulse generator 40.

The pulse generator 40 is responsive to the syncronized trigger pulse emitted for syncronizing circuit 20 to produce an SCR-gating pulse of appropriate magnitude and width. In practice, four pulses are produced with a duty cycle of 4 clock pulses ON and 4 clock pulses OFF, or approximately 43 μs for a 60 Hz line, to ensure proper gating. During steady state operation, these abbreviated pulse trains appear at 60° intervals and are displaced in phase from the reference powerline by an amount proportional to the magnitude of the command signal 12a. The pulses are steered to the appropriate SCR pairs by the sequence circuit 30 and decoding means 310.

As previously described, each trigger pulse from the magnitude comparator 12 causes the sequence circuit to step to its sequentially next state and thereby couple the gate pulses from the pulse generator 30 to the appropriate SCR gate. As shown in FIG. 4, the sequence circuit includes a six step, ring-counter formed from flip-flops 302, 304, 306 and coupled at its output to the first decoding circuit 310 which includes a plurality of NAND gates 308. The NAND gates 308 are configured so that each of the 6 steps activates a respective pair of the output gates 310 a-f which thereby pass the generated pulses 302 to the respective pair of SCR gates via output terminals 32 a-f.

As shown in FIG. 2E, each SCR may be gated anywhere within a range of phase angles depending upon the magnitude of D.C. voltage to be produced by the rectifier system. For example, SCR A+ can conceivably be initially gated anywhere between 60° and 240°-- the angle at which $V_{AB}$ becomes predominate and the angle at which line A ceases to be positive with respect to either of the other lines.

One may note, with reference to FIGS. 2C and 2E that this ranges for some SCR's overlap the period of ramp reset; i.e. a comparator transition for gating an SCR can conceivably be required during the interval in which the timing counter 18 is reset. For example, the d.c. voltage requirement might be such that SCR A- or SCR C+ or SCR B- would mneed to be gated at $\phi_{AB}=30°$; i.e. at the instant that the numerical ramp 12b is reset and thereby discontinuous.

Accordingly, an alternative ramp 120b (FIG. 2D) is generated 180 out of phase with ramp 12b and is used as the ramp input to the magnitude comparator 12 during such periods of discontinuity. As shown in FIG. 2E, SCR's A−, C+, B− are susceptible to being gated during the reset interval. Accordingly, the offset ramp 120b is desirably inputted to the comparator after the sequentially prior SCR B+ Is ignited and until the SCR B− has been gated (hereinafter "offset phase range").

Returning to FIG. 4, an offset ramp generator 200 is shown as coupled to the 3 most significant bits (MSB's) of the ramp counter 18 and is used to modify these bits in such a way that the comparator receives a ramp which is offset from the original counter 18 ramp by 180° (electrical) as required. The relationship between the 3 MSB's of the counter 18 and the 3 MSB's required for the offset ramp 120b is derived as follows. Referring to the MSB of ramp 12b as $Q_{10}$, the next MSB as $Q_9$, and the third MSB as $Q_8$, the bits of the numerical ramp 12b will be:

|         | $Q_{10}$ | $Q_9$ | $Q_8$ |
| ------- | -------- | ----- | ----- |
| 0–60    | 0        | 0     | 0     |
| 60–120  | 0        | 0     | 1     |
| 120–180 | 0        | 1     | 0     |
| 180–240 | 0        | 1     | 1     |
| 240–300 | 1        | 0     | 0     |
| 300–360 | 1        | 0     | 0     |

The offest ramp MSB's will accordingly be as follows if the offset ramp 120b is 180° out of phase with the ramp 12b.

|         | $B_{10}$ | $B_9$ | $B_8$ |
| ------- | -------- | ----- | ----- |
| 0–60    | 0        | 1     | 1     |
| 60–120  | 1        | 0     | 0     |
| 120–180 | 1        | 0     | 1     |
| 180–240 | 0        | 0     | 0     |
| 240–300 | 0        | 0     | 1     |
| 300–360 | 0        | 1     | 1     |

By inspection,
$B_8 = \overline{Q_8}$ $B_9 = \overline{Q_9} \cdot \overline{(Q_8 \oplus Q_{10})}$ $B_{10} = \overline{Q_{10}} \cdot (Q_8 \oplus Q_9)$ The necessary logic circuitry for expressing this relationship is shown in FIG. 4 as the offset ramp generator 200. By modifying the MSB's of the counter 18, a ramp 120b which is offset by 180° is produced when the output of generator 200 is applied as the ramp MSB's to the comparator.

The ramp 12b and the offset ramp 120b are accordingly applied to respective inputs of a signal selecting circuit 202. The signal selecting circuit 202 is responsive to a bi-level ramp-select signal 205 to apply a respectively selected one of the two ramps to the comparator 12.

When the offset ramp 120b is applied to one input of the comparator 12, suitably provision must be made for applying an compensating offset to the other input. Accordingly, an offset adder circuit 206 is coupled to the other input of the comparator 12 to modify the command signal 12a at the same time that the offset ramp 120b is applied. Additionally, the offset adder circuit 206 is used to offset the command signal 12a by 60° (electrical) after each transition to define the next transition point as previously described.

Attention is momentarily diverted from FIG. 4 to explain the operation of the offset adder circuit 206. Earlier in the description, it was pointed out that the 3 MSB's of the counter 18 represented 60° increments. Accordingly, one may appreciate that for two points on the ramp 12b which are separated by 60° (electrical), the bit values of the counter 18 will be identical except for the MSB's.

If the two points are assumed to be transition points, then the bit values of the command signal 12a must have the same relationship for the comparator 12 to operate since the command signal is equal to the ramp value at the transition.

Thus, one can offset the command signal 12a by 60° with the simple binary addition of MSB's.

A command signal 208, 210 offset is accordingly applied to the offset adder circuit 206 for inclusion as on the command signal 12a. Signal 208 is logic "1" when a 60° offset is desired while signal 210 is '1' when a 120° offset is desired. As will be explained, these two offsets, together, with selective use of an alternative ramp which is 180° out of phase with the original ramp, fulfill the design requirements of the preferred system.

The timely production of the ramp select signal and the command offset signal, and their interrelationship can best be explained by reference to the following truth table which correlates their desired presence ('1') or absence ('0') with the state of the ring counter 30.

| State of Sequencer 30 | | | Signal 205 | Signal 208 | Signal 210 |
|---|---|---|---|---|---|
| $A_0$ | $A_1$ | $A_2$ | (Ramp Selector) | (60 offset) | (120 offset) |
| 0 | 0 | 0 | 0 | 1 | 0 |
| 1 | 0 | 0 | 0 | 0 | 1 |
| 1 | 1 | 0 | 1 | 0 | 0 |
| 1 | 1 | 1 | 1 | 1 | 0 |
| 0 | 1 | 1 | 1 | 0 | 1 |
| 0 | 0 | 1 | 0 | 0 | 0 |

As the table illustrates, it is desired that the first transition causes the sequencer 30 to change to state 000 and increment the command signal by 60°. After the second transition, a second increment of 60° occurs for a total of 120° offset. After the third transition, the alternate ramp is used with the offset cycle of 0, 60° and 120° being repeated. Since the alternative ramp is offset 180° from the original ramp, the effect of the repeated offset cycle is the further 60° incremental offsetting of the first three transitions. It will be appreciated that the state of the sequencer 30 is cyclically sequenced, with the seventh transition (i.e. the first transition of the next power line cycle) returning the sequencer to the 000 state.

From the table, the $A_1$ bit of the sequencer 30 is seen to provide the correct logic value required by the ramp-select signal 205, and is so implemented as shown in FIG. 4.

The signals 208, 210 can be decoded from the bits $A_0$ $A_1$ $A_2$ by means of logic circuitry illustrated in FIG. 4 as decoder means 212.

One problem may exist when the transitions occurs early in the ignition range of an SCR. For example, if SCR B+ is gated between $\phi_{AB}=180°-210°$; the sequencer 30 and decoding means operate to switch to the alternate ramp and command signals. Since the alternate ramp resets at 210°, the comparator will detect the end value of the alternative ramp, and compare it with the smaller command signal value consequently generating an erroneous trigger signal 12c. Circuit 20 prevents such an event by monitoring a disabling signal 204 and the two MSB's of the newly selected ramp.

The disabling signal 204 is produced when a new ramp is used, for the first time; i.e. when the ramp-select signal changes. As shown in the foregoing truth table, a change in the ramp-select signal is accompanied by a value of '0' for both signals 208, 210. Accordingly, an NOR gate responsive to signals 208, 210 provides a proper disabling signal 204 to the syncronizing circuit 20 which responsively blocks the comparator output from appearing at terminal 20a.

The disabling signal 204 is countermanded by the resetting to logic '0' of the 2 MSB's of the newly selected ramp; indicating that the reset of the ramp has taken place.

While the foregoing description describes and illustrates a preferred embodiment, variations and modifications may be made to the disclosed circuitry without departing from the spirit of the invention. Accordingly, it is intended that the present invention be defined solely by the appended claims and that those claims be given the broadest interpretation allowable in view of the prior art so as to include all such modifications and variations which would be obvious tothose skilled in the art and having the benefit of the present teachings. For example, provision may be made for sensing and accommodating opposite line rotation (i.e. CBA rotation) by providing additional decoding. Additionally, the ring counter 30 may be permitted to cycle backwards for CBA rotation, with appropriate modifications being made to the "select signal" logic.

I claim:

1. For use with a multi-phase rectifier system of the type including a plurality of selectively gateable semiconductive devices coupled between a multi-phase power source and a d.c. load and arranged to couple rectified D.C. voltage across the load,
   a timing generator for selectively gating appropriate semiconductive devices at appropriate power line phase angles so as to controllably vary the rectified voltage, the timing generator comprising:
   means for producing a first signal having unique values representative of respective power line phase angles;
   comparator means adapted to receive a command signal indicative of the ignition phase angle at which gating is desired and for comparing the first and command signal values; the comparator means undergoing a transition in output state when the two signals are substantially equal;

sequence means having a plurality of sequentially occuring output states and being responsive to the comparator means transition to assume the sequentially next output state when gating occurs, the sequence means including first decoding means responsive to the output states to couple uniquely respective semi-conductive devices to a source of gating pulses in accordance with the ignition pattern associated with the multi-phase source.

2. The timing generator of claim 1 wherein said first signal producing means includes means for cyclically producing a first ramp-like signal in phase syncronization with the power source.

3. The timing generator of claim 2 wherein the comparator means is adapted to receive a command signal having a magnitude indicative of the phase angle at which gating is desired and which produces a trigger signal in response to the passing of the ramp through the magnitude.

4. The timing generator of claim 1 or 3 wherein the sequence means has a cyclical sequence of output states.

5. The timing generator of claim 2 or 3 including means for cyclically producing a second ramp-like signal which is offset in phase from the first ramp-like signal first means for selectively applying the second ramp-like signal to the comparator means instead of the first ramp-like signal during discontinuation in the latter signal.

6. The timing generator of claim 5 including second means for modifying the command signal in accordance with the magnitude of the second ramp-like signal at the ignition angle and for selectively applying the modified command signal to the comparator means when the second ramp-like signal is so applied.

7. The timing generator of claim 6 wherein the first and second means are responsive to certain of the output states of the sequencing means to apply the modified command signal and the second ramp-like signal during an offset phase range, the offset phase range commencing after the ignition of a semiconductive device which is not susceptible to gating during the discontinuity of the first ramp-like signal and terminating after the last susceptible semiconductor device in the ignition pattern has been gated.

8. The timing generator of claim 5 wherein the first ramp-like signal producing means produces a multi-bit digital signal and the second ramp-like signal producing means is operative to modify at least a portion of the bits.

9. The timing generator of claim 8 wherein the portion includes the three MSB's.

10. The timing generator of claim 9 wherein the relationship between the three MSB's and modified three MSB's is:

$B_8 = \overline{Q}_8$ $B_9 = \overline{Q}_9 \cdot \overline{(Q_8 \oplus Q_{10})}$ $B_{10} = \overline{Q}_{10} \cdot \overline{(Q_8 \oplus Q_9)}$ where:

$Q_8$, $Q_9$, $Q_{10}$ are respectively the 3rd MSB, 2nd MSB and MSB of the first ramp, $B_8$, $B_9$, $B_{10}$ are respectively the 3rd MSB, 2nd MSB and MSB of the second ramp, Q means "not Q" $\oplus$ means "exclusive or"

11. The timing generator of claim 1 including second decoding means responsive to the comparator means transition to modify the command signal, the modification being such that the value of the modified command signal is substantially the value of the first signal at 360°/2n (electrical) after the transition (where n is the number of power line phases); and means for applying the modified command signal as the command signal to the comparator means.

12. For use with a three-phase rectifier system of the type including a plurality of selectively gateable semiconductive devices coupled between a three-phase power source and a d.c. load and arranged to couple rectified D.C. voltage across the load, a timing generator for selectively gating appropriate semiconductive devices at appropriate power line phase angles so as to controllably vary the rectified voltage, the timing generator comprising:

means for cyclically producing a first multi-bit digital ramp-like signal of incrementally changing magnitude, means for syncronizing the ramp-like signal with a reference line voltage of the three-phase source so that the ramp-like signal exhibits unique values respectively representative of power source phase angles;

comparator means adapted to receive a command signal indicative of the ignition phase angle at which gating is desired for undergoing a transition in output state when the first ramp-like signal passes through the command signal magnitude;

sequence means having six sequentially occurring output states and being responsive to each transition to assume the sequentially next output state;

first decoding means responsive to the output states of the sequence means to couple respective semiconductive devices to a source of gating pulses in accordance with the ignition pattern associated with the three-phase source; and second decoding means responsive to the output state of the sequence means to selectively modify the command signal and apply the modified command signal to the comparator means as the command signal, the modification being such as to define a new transition point 60° (electrical) after the last termination.

13. The timing generator of claim 12 including means for producing a second ramp-like signal which offsets from the first ramp-like signal by 180° (electrical).

the second decoder means being responsive to the output state of the sequencing means to selectively apply the second ramp-like signal to the comparator means for the range of power source phase angles during which the gating of semiconductive device might coincide with resetting of the first ramp-like signal;

the second decoder means being operable to define a three-step offset cycle wherein the command signal is sequentially unmodified to define an initial transition point, modified to define a new transition point 60° (electrical) subsequent, and modified to define a third transition point 120° (electrical) subsequent to the initial transition point, the offset cycle being repeated when the comparator means is selectively coupled to either of the two ramp-like signals.

* * * * *

UNITED STATES PATENT AND TRADEMARK OFFICE
CERTIFICATE OF CORRECTION

PATENT NO. : 4,348,718                                Page 1 of 3
DATED      : September 7, 1982
INVENTOR(S): Donald E. Vollrath It is certified that error appears in the above-identified patent and that said Letters Patent are hereby corrected as shown below:

IN THE DRAWINGS:

In sheet 1, Fig. 3, block 30 should be labelled --SEQUENCER--; Block 310 should be labelled --DECODER--; Block 312 should be labelled --DECODER--.

In sheet 2, Fig. 2A, delete the two circles on the waveforms at $60°$ and at $240°$.

In Fig. 2E add the caption --SCR IGNITION ANGLE RANGES--.

Figure 4A:
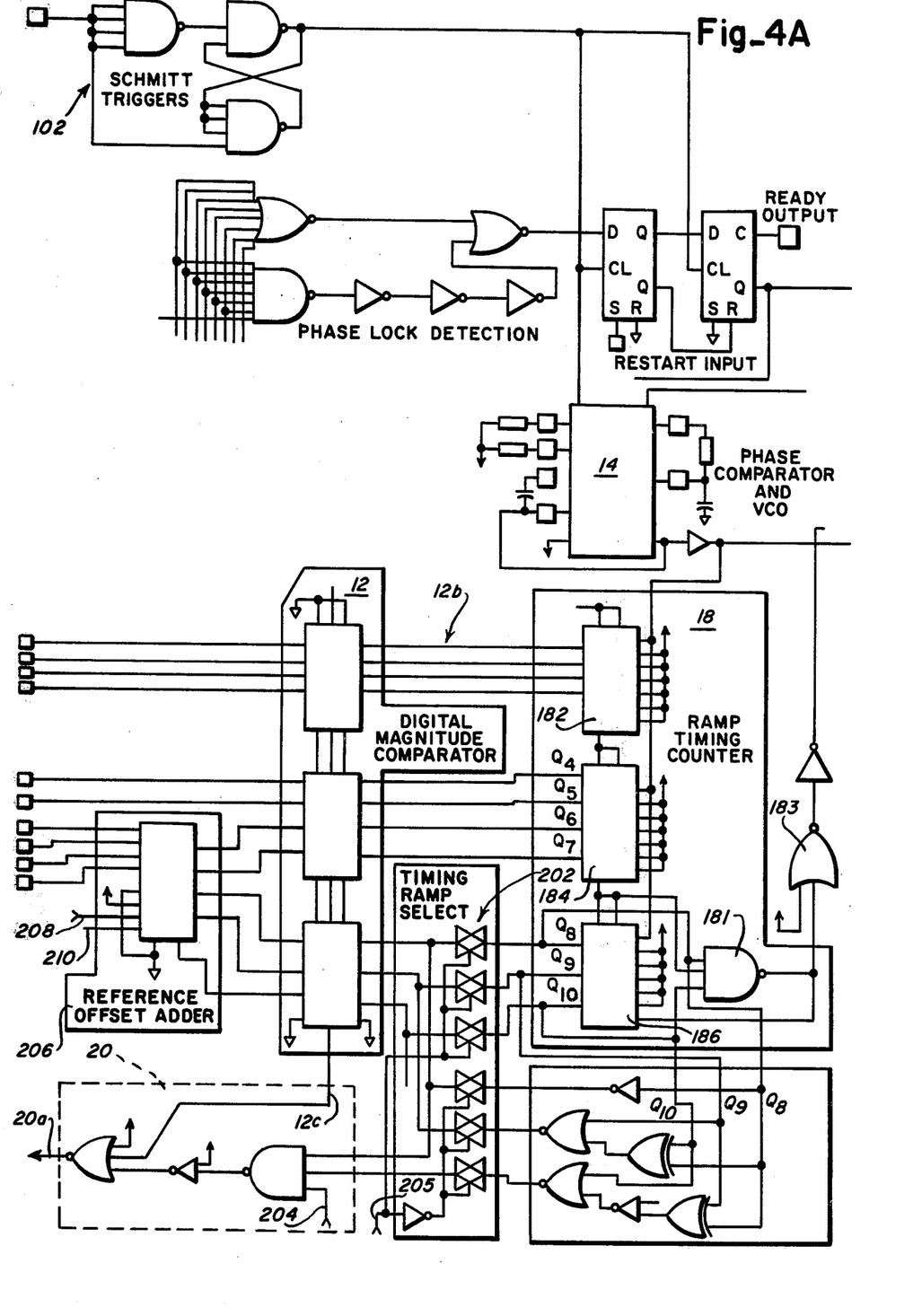
FIG. 4 is a schematic illustration showing a preferred embodiment of the timing generator in FIG. 3.

In sheet 3, Fig. 4A should appear as shown in the certificate of correction.

Figure 4B:
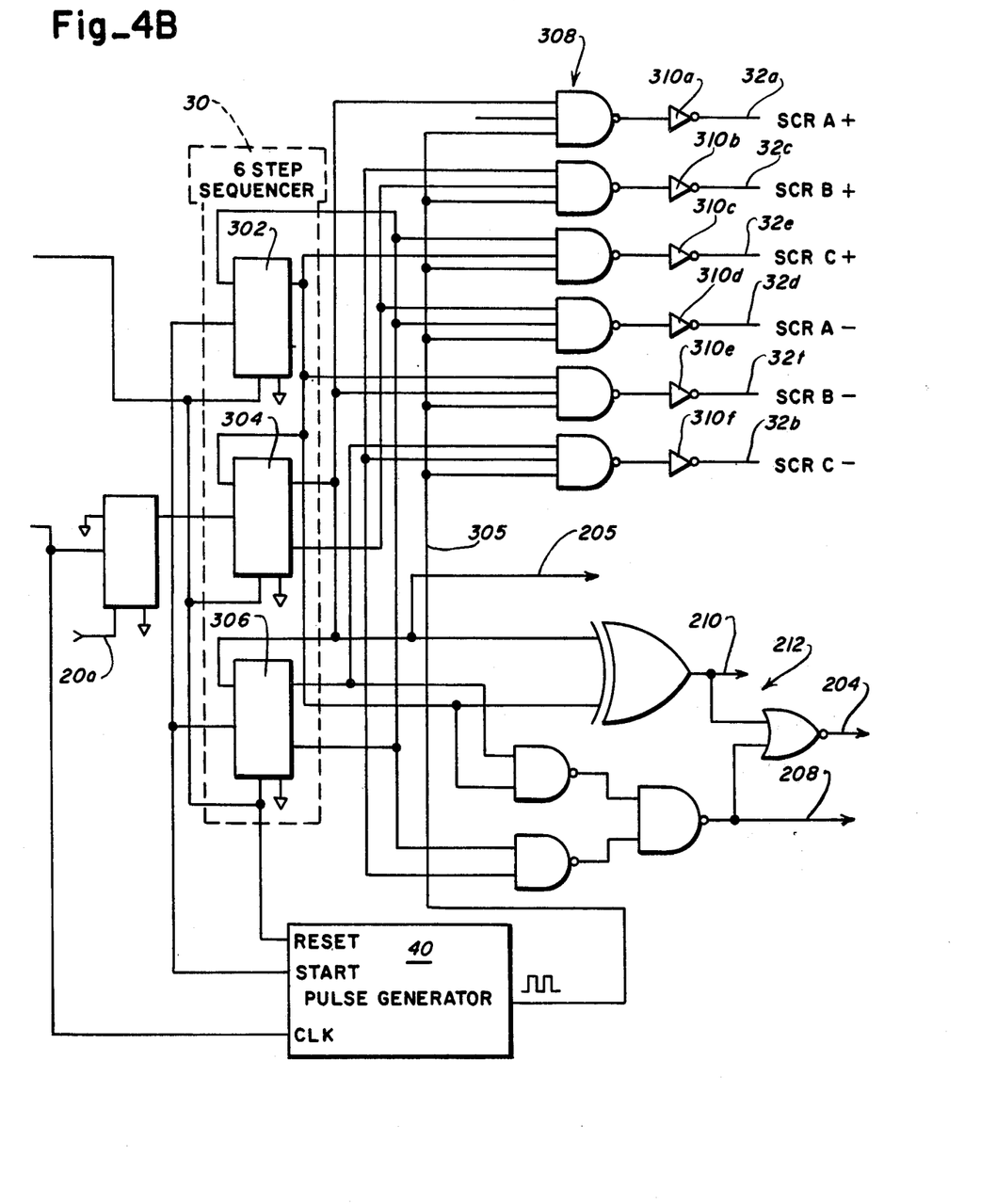

In sheet 4, Fig. 4B should appear as shown in the certificate of correction.

Signed and Sealed this

Second Day of October 1984

[SEAL]

Attest:

GERALD J. MOSSINGHOFF

Attesting Officer        Commissioner of Patents and Trademarks

UNITED STATES PATENT AND TRADEMARK OFFICE
CERTIFICATE OF CORRECTION

PATENT NO. : 4,348,718

DATED : September 7, 1982

INVENTOR(S) : Donald E. Vollrath

It is certified that error appears in the above-identified patent and that said Letters Patent are hereby corrected as shown below:

UNITED STATES PATENT AND TRADEMARK OFFICE
CERTIFICATE OF CORRECTION

PATENT NO. : 4,348,718

DATED : September 7, 1982

INVENTOR(S) : Donald E. Vollrath

Page 3 of 3

It is certified that error appears in the above-identified patent and that said Letters Patent are hereby corrected as shown below:

Fig-4B